(12) United States Patent
Stuetz et al.

(10) Patent No.: US 6,880,509 B2
(45) Date of Patent: Apr. 19, 2005

(54) INTAKE MANIFOLDING FOR AN INTERNAL COMBUSTION ENGINE

(75) Inventors: Harald Stuetz, Semriach (AT); Reinhard Glanz, Graz (AT); Markus Schwarzl, St. Marein Bei Graz (AT); Manfred Suppan, Lasznitzhoehe (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/640,506

(22) Filed: Aug. 21, 2003

(65) Prior Publication Data

US 2004/0159300 A1 Aug. 19, 2004

(30) Foreign Application Priority Data

Aug. 23, 2002 (AT) ..................................... GM563/2002
May 15, 2003 (AT) ..................................... GM336/2003

(51) Int. Cl.$^7$ ............................................... F02N 3/00
(52) U.S. Cl. .................................................. 123/188.14
(58) Field of Search ........................... 123/188.14, 306, 123/308

(56) References Cited

U.S. PATENT DOCUMENTS

| 4,930,468 | A | 6/1990 | Stockhausen |
| 6,550,447 | B1 * | 4/2003 | Stutz et al. ............... 123/308 |

FOREIGN PATENT DOCUMENTS

| AT | 402326 | 4/1997 |
| AT | 3137 | 10/1999 |
| AT | 5037 | 2/2002 |
| EP | 258207 | 7/1987 |
| EP | 554235 | 8/1993 |
| GB | 4012492 | 10/1990 |
| JP | 08170537 | 7/1996 |

* cited by examiner

Primary Examiner—Henry C. Yuen
Assistant Examiner—Hyder Ali
(74) Attorney, Agent, or Firm—Dykema Gossett PLLC

(57) ABSTRACT

An intake manifolding for an internal combustion engine in which the swirl of at least one intake charge flowing into a combustion chamber through at least one intake port opening is variable, the intake port opening being controlled by an intake valve and at least one intake valve comprising at least two intake flow paths formed by intake passages that are completely independent of one another, said flow paths rejoining in the region of the valve chamber, at least one of the intake passages being configured as a primary passage and at least one intake passage as a secondary passage, the flow through the secondary passage being variable by means of a control facility and the secondary passage being configured as a neutral or tangential passage, the primary passage being configured as a tangential passage defining a flow stalling edge at the intersection between a first entrance cross-section and the intake port opening.

12 Claims, 3 Drawing Sheets

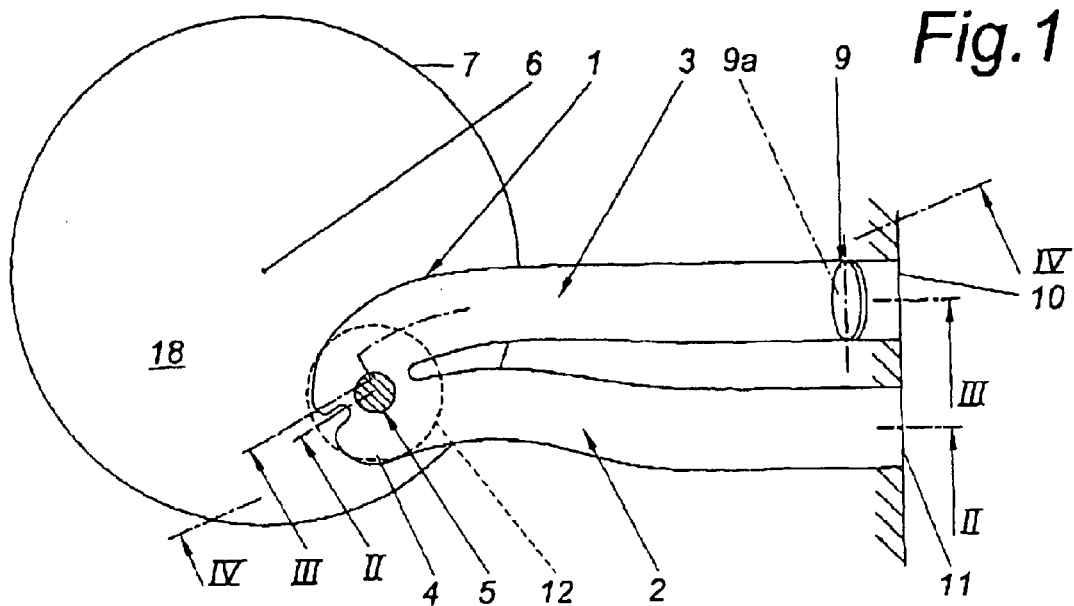
Fig.1
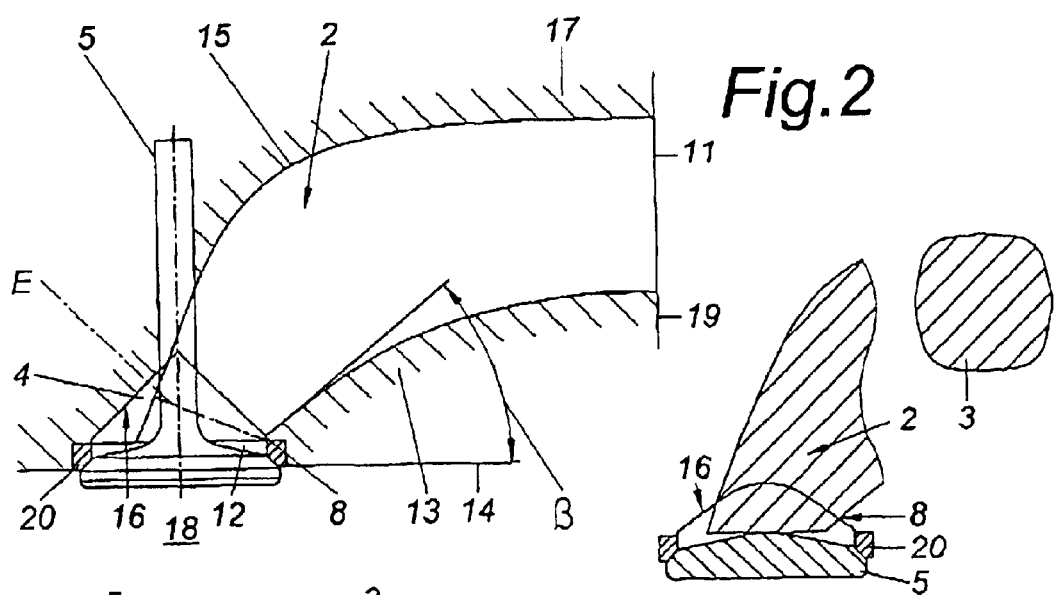
Fig.2
Fig.4
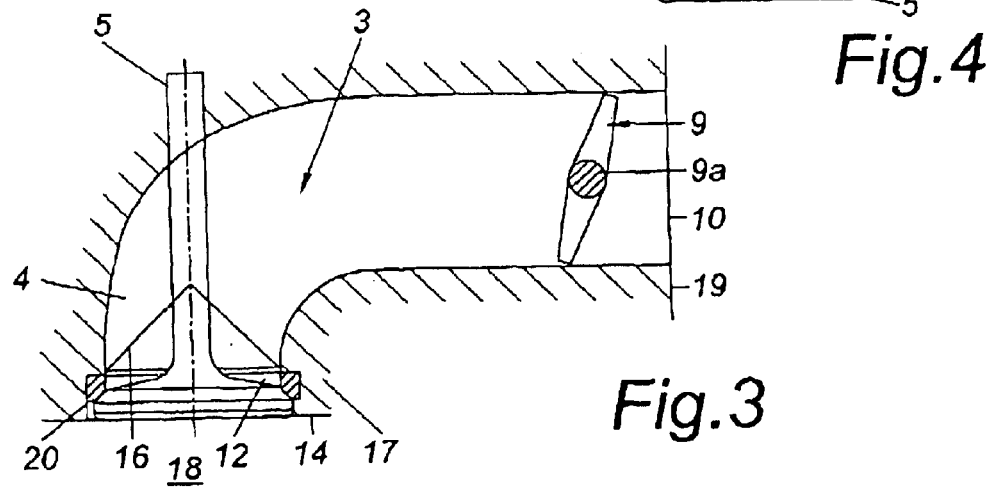
Fig.3

INTAKE MANIFOLDING FOR AN INTERNAL COMBUSTION ENGINE

BACKGROUND OF THE INVENTION

The invention relates to an intake manifolding for an internal combustion engine in which the swirl of at least one intake charge flowing into a combustion chamber through at least one intake port opening is variable, the intake port opening being controlled by an intake valve and at least one intake valve comprising at least two intake flow paths formed by intake passages that are completely independent of one another, said flow paths rejoining in the region of the valve chamber, at least one of the intake passages being configured as a primary passage and at least one intake passage as a secondary passage, the flow through the secondary passage being variable by means of a control facility and the secondary passage being configured as a neutral or tangential passage.

DESCRIPTION OF PRIOR ART

EP 0 258 207 B discloses an intake passage for an internal combustion engine having a divider wall extending in the longitudinal direction. In order to achieve in the cylinder a swirling motion that is sufficiently strong at part load on the one hand and the best possible charge of the cylinder at higher speeds on the other hand, the divider wall is disposed parallel to the cylinder bore centerline in an intake passage that develops a very low level of swirl. If for part load the flow is desired to be provided with a swirling motion, a portion of the passage is closed by a control valve. As a result, the charge unsymmetrically flows through the valve into the cylinder and a strong rotational motion is imparted to said flow through interaction with the cylinder wall. The disadvantage thereof is that, as a result of the basically neutral form of the passage, a swirl interval ranging from low to medium swirl values only is spanned.

U.S. Pat. No. 4,930,468 describes an intake manifolding with an intake passage that is split into primary and secondary passages by a vertical divider wall, said intake passage discharging at a quite steep angle into the combustion chamber. A flow stalling edge in the region of a first intake cross section of the primary passage is not provided. This patent only permits to achieve mean swirl values.

Flow stalling edges in the discharge region of an undivided intake passage entering a combustion chamber are known from EP 0 554 235 A1 or from DE 40 12 492 A1.

AT 003.137 U1 discloses an internal combustion engine with two intake valves for each cylinder, one intake passage leading to a respective one of said cylinders. One of the two intake passages is split into two passages by a divider wall that extends over the entire height of the passage. Again, the swirl can only be adjusted within a relatively narrow swirl interval.

A cylinder head with two intake passages for each cylinder is further known from AT 402 326 B1, one of the two passages being split by a divider wall into two passages. The two intake passages are configured to be charge passages the walls of which ensure swirl-free flow within the very passage. Like AT 003.137 U1, this construction suffers from the disadvantage that the swirl is adjustable in a quite narrow swirl interval only.

Variable swirl regulation demand in internal combustion engines leads to conflicting objectives, the one aiming at having the swirl adjustable over a wide range and the other at providing the highest possible flow rate at a high level of swirl.

AT 5.037 U1 discloses an intake manifolding for an internal combustion engine having a primary passage and a secondary passage, with the primary passage assuming a spiral configuration. The secondary passage is closable through a control facility. This permits on the one side to realize a wide swirl adjusting range and on the other side to attain a good flow rate both at a high and at a low level of swirl. However, for space or manufacturing reasons, primary passages configured as spiral passages cannot be utilized in any internal combustion engine.

SUMMARY OF THE INVENTION

The objective of the present invention is to evolve an intake manifolding that is easy to manufacture, requires little space and permits a high flow rate at a high level of swirl as well as a wider range for adjusting the swirl.

In accordance with the invention this is achieved in that the primary passage configured as a tangential passage comprises, at the intersection between a first entrance cross-section and the intake port opening, a flow stalling edge. The two intake passages, which are arranged radially relative to the cylinder bore centerline, substantially side by side, at least in the region of the valve chamber, lead to one single intake valve, the primary passage being spaced from the cylinder bore centerline a greater distance apart than the secondary passage. The secondary passage may be configured to be a neutral or a tangential passage or any intermediate stage between these two implementations. This construction permits on the one hand to realize a very wide range for adjusting the swirl and on the other hand to achieve a good flow rate both at a high and at a low level of swirl.

There is preferably provided that the flow stalling edge be formed by having a control section intersecting the intake passage wall. The primary passage discharges thereby into the cylinder compartment at a flat angle, the passage underside of the primary passage located nearest to the plane of the cylinder head being inclined at an angle $\beta<60°$, preferably $\beta<45°$, to the plane of the cylinder head.

In order to achieve a good swirl there is provided that the cross-section of the primary channel be narrowed in the region of the first entrance cross-section, preferably in a direction that is approximately tangential to the cylinder bore centerline.

In a further embodiment of the invention, at least two intake port openings are provided for each cylinder, one primary passage and one secondary passage being provided for each intake port opening. A control facility is disposed in each secondary passage. A particularly high rate of swirl can be achieved by disposing another control facility in a primary passage.

BRIEF DESCRIPTION OF THE DRAWINGS

The invention will be understood better upon reading the following description accompanying the drawing wherein:

FIG. 1 is a top view of an intake manifolding of a cylinder in accordance with the invention in a first embodiment, FIG. 2 is a sectional view of the intake manifolding taken along the line II—II of FIG. 1, FIG. 3 is a sectional view of the intake manifolding taken along the line III—III of FIG. 1, FIG. 4 is a sectional view of the intake manifolding taken along the line IV—IV of FIG. 1.

DETAILED DESCRIPTION OF THE PREFERRED EMBODIMENTS

Figure 5:
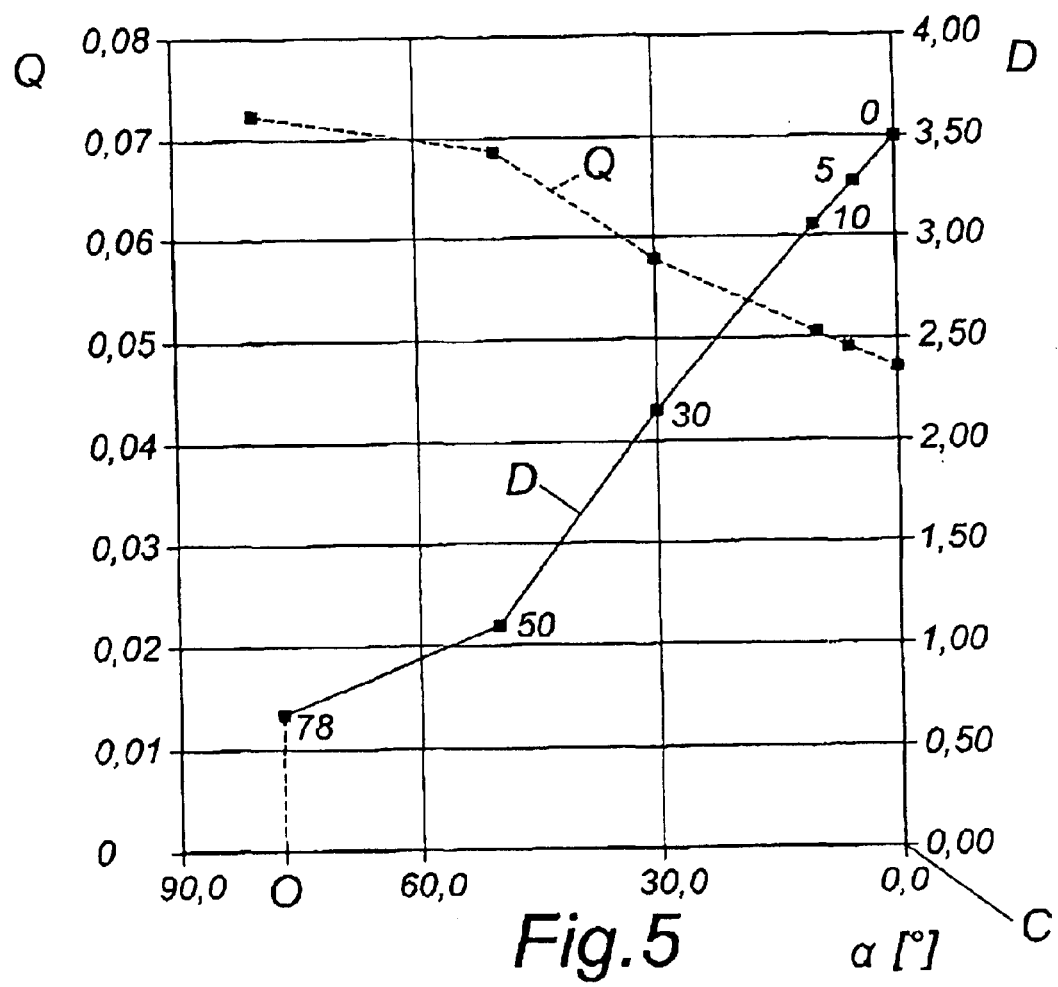
FIG. 5 is a diagram of characteristics of said intake manifolding.

In the exemplary embodiments, like elements will bear the same reference numerals.

The intake manifolding 1 for the cylinder head 17 of an internal combustion engine comprises a primary passage 2 and a secondary passage 3 that rejoin in the region of the valve chamber 4 of the intake valve 5. Before they discharge into the valve chamber 4, the primary passage 2 and the secondary passage 3 are completely separate. The primary passage 2 is thereby configured as a tangential passage and the secondary passage 3 as a neutral passage or as a tangential passage as well.

The secondary passage 3 may be implemented to be a neutral or a tangential passage or any intermediate stage between a neutral passage and a tangential passage. The two intake passages 2, 3, which take departure from an intake manifold that has not been illustrated herein, lead to one single intake valve 5, the primary and secondary passages 2, 3 being arranged, radially relative to the cylinder bore centerline 6 of the cylinder 7, side by side at least in the region of the valve chamber 4. The primary passage 2, which discharges tangentially into the cylinder 7, is thereby spaced a greater distance from the cylinder bore centerline 6 than the secondary passage 3. Together with the cylinder head 17 and a piston that has not been illustrated herein the cylinder 7 forms a combustion chamber 18.

The secondary passage 3 is closed in part or in whole by a control facility 9 that may be configured to be a flap, a tab or a drum gate or the like. The flange face 10 of the secondary passage 3 can thereby be slightly offset from the flange face 11 of the primary passage 2 so that the axis 9*a* of a control facility 9 implemented as a flap will not pass through the cross-section of the primary passage 2. Another control facility may be disposed in the primary passage 2, an additional possibility of adjusting the swirl being thus provided. In the exemplary embodiment, the flange faces 10, 11 take departure from a side wall 19 of the cylinder head 17 that extends parallel to the cylinder bore centerline 6. The flange faces 10, 11 may as well be configured to take departure from an upper top face of the cylinder head 17 (not shown) or be inclined toward the top face and the side wall 19. One of the two flange faces 10, 11 may also take departure from the top region and the other from a side wall 19 of the cylinder head 17.

In order to achieve a strong swirling flow within the combustion chamber 18, a flow stalling edge 8 is formed on the bottom passage wall 13 that is nearest to the cylinder head plane 14 at the intersection between a first entrance cross-section E of the primary passage 2 and the intake port opening 12. In the exemplary embodiment, the intake port opening 12 is defined by a valve seat ring 20. The bottom passage wall 13 is inclined at an angle of β<45° to the cylinder head plane 14. In the region of the first entrance cross-section E, between the bottom passage wall 13 and the top passage wall 15, the primary passage 2 is constricted in a direction that is approximately tangential to the cylinder bore centerline 6.

The control section 16 in the region of the intake port opening 12 forms the flow stalling edge 8 and gives the primary passage 2 its shape.

The intake manifolding 1 can be utilized both in internal combustion engines having an intake valve 5 and in internal combustion engines having two or several intake valves for each cylinder 7. In internal combustion engines having two or several intake valves for each cylinder 7, the primary passage 2 may join together with other primary passages of the intake system within the cylinder head.

In FIG. 5, the swirl D and the flow rate Q are plotted down the side of the diagram whereas the flap angle σ is plotted on the horizontal axis for an exemplary intake manifolding having a control facility configured as a flap. The flap angle σ=0 corresponds to the closed position of the flap. At about 78° the flap is in a completely open position. It is obvious that the swirl D is widely variable between the open position 0 and the closed position C with the flow rate Q being only slightly reduced.

Figure 6:
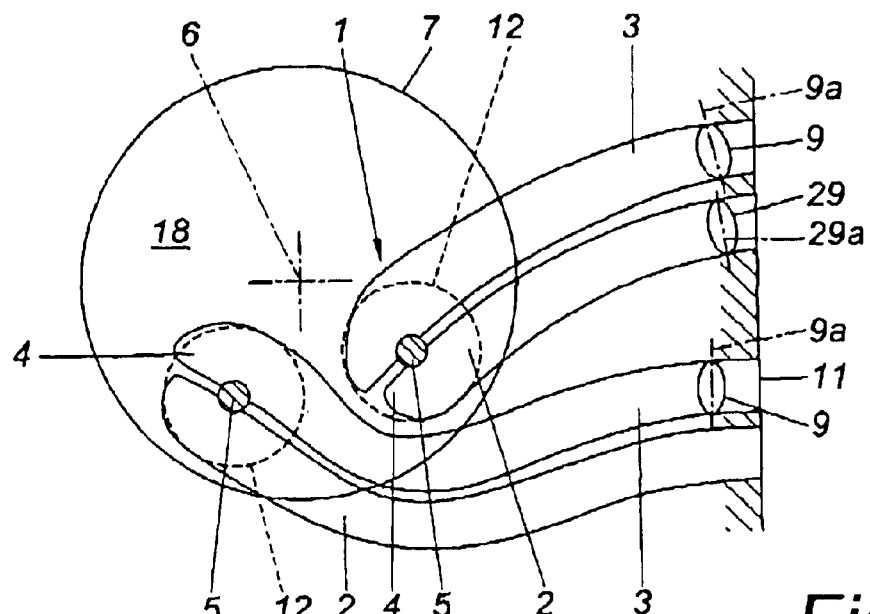
FIG. 6 is a top view of an intake manifolding in accordance with the invention in a second embodiment and FIG. 7 is a diagram of characteristics of the second embodiment.

FIG. 6 shows a variant of an intake manifolding 1 for an internal combustion engine having two intake port openings 12 for each cylinder 7. A primary passage 2 and a secondary passage 3 lead to each intake port opening 12. A control facility 9 for shutting off the passage is disposed in at least one secondary passage 3, preferably in every secondary passage 3. Particularly high swirl rates are achievable if a control facility 29 is disposed in a primary passage 2 as well, said control facility being configured, in the exemplary embodiment, as a flap that is rotatable about an axis 29*a*.

Figure 7:
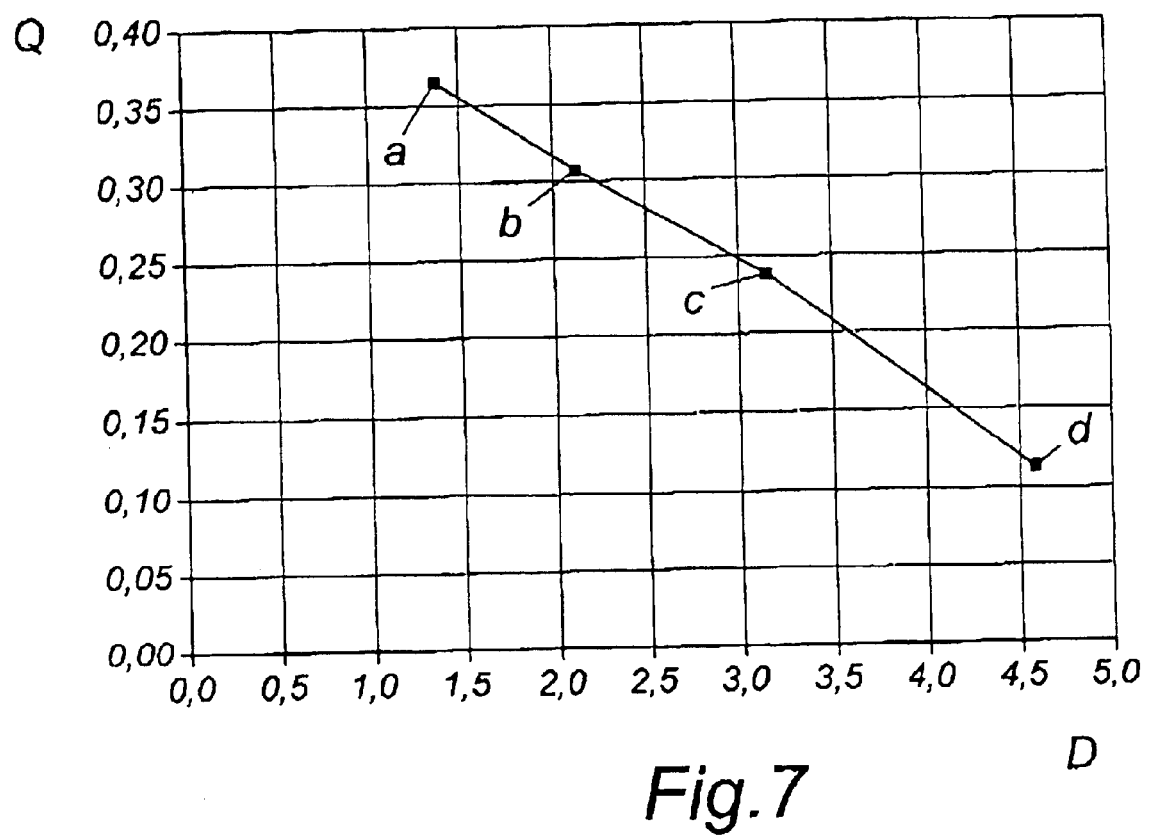

In FIG. 7, the flow rate Q and the reduced swirl rate D of the embodiment shown in FIG. 6 are plotted in a diagram for three control facilities 9, 29—in the two secondary passages 3 and in one primary passage 2. The FIG. shows the cases a—all the flaps are open, b—one flap is closed, c—two flaps are closed and d—three flaps are closed. As can be seen, three control facilities 9, 29 permit to achieve high swirl rates >4,5 (using the impeller method).

As compared to conventional intake manifoldings with one intake passage that is divided into two passage portions by a divider wall, all of the embodiments offer the advantage of providing a wide range for adjusting the swirl.

What is claimed is:

1. An intake manifolding for an internal combustion engine in which the swirl of at least one intake charge flowing into a combustion chamber through at least one intake port opening is variable, the intake port opening being controlled by an intake valve and at least one intake valve comprising at least two intake flow paths formed by intake passages that are completely independent of one another, said flow paths rejoining in the region of the valve chamber, at least one of the intake passages being configured as a primary passage and at least one intake passage as a secondary passage, the flow through the secondary passage being variable by means of a control facility and the secondary passage being configured as a neutral or tangential passage, wherein the primary passage configured as a tangential passage comprises, at the intersection between a first entrance cross-section and the intake port opening, a flow stalling edge, and wherein the flow stalling edge is formed of a bottom passage wall of the primary channel located nearest to a cylinder head plane intersecting the control section.

2. The intake manifolding according to claim 1, wherein a cross-section of the primary passage in the region of the first entrance cross-section is narrowed.

3. The intake manifolding according to claim 2, wherein the cross-section of the primary passage in the region of the first entrance cross-section is narrowed in a direction that is approximately tangential to a cylinder bore centerline.

4. The intake manifolding according to claim 1, wherein said primary passage and said secondary passage are arranged radially relative to the cylinder bore centerline, substantially side by side, at least in the region of the valve chamber.

5. The intake manifolding according to claim 4, wherein the primary passage being spaced a greater distance from the cylinder bore centerline than the secondary passage.

6. The intake manifolding according to claim 1, wherein the primary passage discharges into the combustion chamber at a flat angle.

7. The intake manifolding according to claim 6, wherein the bottom passage wall of the primary passage located nearest to the plane of the cylinder head is inclined at an angle $\beta<60°$ to the plane of the cylinder head.

8. The intake manifolding according to claim 6, wherein, the bottom passage wall of the primary passage located nearest to the plane of the cylinder head is inclined at an angle $\beta<45°$, to the plane of the cylinder head.

9. The intake manifolding according to claim 1, wherein at least two intake port openings are provided for each cylinder and one primary passage and one secondary passage are provided for each intake port opening.

10. The intake manifolding according to claim 9, wherein one control facility is disposed in each secondary passage.

11. The intake manifolding according to claim 10, wherein another control facility is disposed in one primary passage.

12. An intake manifolding for an internal combustion engine in which the swirl of at least one intake charge flowing into a combustion chamber through at least one intake port opening is variable, the intake port opening being controlled by an intake valve and at least one intake valve comprising at least two intake flow paths formed by intake passages that are completely independent of one another, said flow paths rejoining in the region of the valve chamber, at least one of the intake passages being configured as a primary passage and at least one intake passage as a secondary passage, the flow through the secondary passage being variable by means of a control facility and the secondary passage being configured as a neutral or tangential passage, wherein the primary passage configured as a tangential passage comprises, at the intersection between a first entrance cross-section and the intake port opening, a flow stalling edge, and wherein the primary passage and the secondary passage are arranged radially relative to the cylinder bore centerline, substantially side by side, at least in the region of the valve chamber.

* * * * *